United States Patent

Starkovich et al.

[11] Patent Number: 5,921,357
[45] Date of Patent: Jul. 13, 1999

[54] SPACECRAFT DEPLOYMENT MECHANISM DAMPER

[75] Inventors: John A. Starkovich, Redondo Beach; Emil M. Shtarkman, Marina Del Ray; Louis A. Rosales, Manhattan Beach, all of Calif.

[73] Assignee: TRW Inc., Redondo Beach, Calif.

[21] Appl. No.: 08/839,563

[22] Filed: Apr. 14, 1997

[51] Int. Cl.⁶ .................. F16F 6/00; F16F 9/12; F16D 57/00
[52] U.S. Cl. .................. 188/267.2; 188/267.1; 188/290; 188/322.5
[58] Field of Search ............... 74/572, 574; 188/266, 188/267.1, 267.2, 290, 322.5; 192/21.5, 58.4, 58.61, 84.1, 84.3, 84.31; 248/550, 562; 267/136, 140.14, 140.15

[56] References Cited

U.S. PATENT DOCUMENTS

| | | |
|---|---|---|
| 2,751,352 | 6/1956 | Bondi . |
| 3,450,238 | 6/1969 | Adkins .................. 192/21.5 |
| 3,699,581 | 10/1972 | Hall et al. . |
| 3,865,216 | 2/1975 | Gryglas .................. 188/290 |
| 4,200,003 | 4/1980 | Miller .................. 74/574 |
| 4,578,920 | 4/1986 | Bush et al. . |
| 4,635,773 | 1/1987 | Llewellin .................. 192/46 |
| 4,733,758 | 3/1988 | Duclos et al. . |
| 4,819,772 | 4/1989 | Rubel . |
| 4,842,106 | 6/1989 | Ligwig et al. .................. 188/266 |
| 4,896,754 | 1/1990 | Carlson et al. .................. 188/267.1 |
| 4,938,322 | 7/1990 | Sugasawara et al. .................. 188/290 |
| 5,167,850 | 12/1992 | Shtarkman . |
| 5,176,368 | 1/1993 | Shtarkman et al. . |
| 5,257,681 | 11/1993 | Shtarkman et al. . |
| 5,267,633 | 12/1993 | Endo et al. .................. 188/267 |
| 5,277,281 | 1/1994 | Carlson et al. . |
| 5,284,330 | 2/1994 | Carlson et al. . |
| 5,349,537 | 9/1994 | Burger et al. . |
| 5,354,488 | 10/1994 | Shtarkman et al. . |
| 5,366,048 | 11/1994 | Watanabe et al. . |
| 5,374,367 | 12/1994 | Edamura et al. . |
| 5,376,294 | 12/1994 | Okada et al. . |
| 5,380,450 | 1/1995 | Conway et al. . |
| 5,382,373 | 1/1995 | Carlson et al. . |
| 5,396,973 | 3/1995 | Schwemmer et al. . |
| 5,398,785 | 3/1995 | Leitmann et al. . |
| 5,412,006 | 5/1995 | Fisher et al. . |
| 5,417,314 | 5/1995 | Sproston et al. . |
| 5,417,874 | 5/1995 | Carlson et al. . |
| 5,429,761 | 7/1995 | Havelka et al. . |
| 5,435,931 | 7/1995 | Kim et al. . |
| 5,435,932 | 7/1995 | Bryant et al. . |
| 5,492,312 | 2/1996 | Carlson .................. 267/140.14 |
| 5,553,514 | 9/1996 | Walkowe .................. 74/574 |
| 5,573,088 | 11/1996 | Daniels .................. 188/267 |
| 5,655,757 | 8/1997 | Starkovich et al. .................. 267/140.15 |
| 5,673,459 | 10/1997 | Baghdasarian .................. 16/308 |

FOREIGN PATENT DOCUMENTS

| | | |
|---|---|---|
| 4134354A1 | 10/1991 | Germany . |
| 2282863 | 10/1993 | United Kingdom . |
| 2275661 | 2/1994 | United Kingdom . |

*Primary Examiner*—Chris Schwartz
*Attorney, Agent, or Firm*—Michael S. Yatsko

[57] ABSTRACT

The present invention provides an electrorheological magnetic (ERM) fluid-based rotary motion damper (12). According to the invention, the ERM fluid-based rotary motion damper (12) generally includes an input shaft (18) coupled to a first damping member (16) and rotatably supporting a second damping member (20). A cylinder (28) coupled about the first damping member (16) rotatably engages a housing (36) circumferentially coupled about the second damping member (20). As such, the cylinder (28) is configured for rotary movement relative to the housing (36). ERM fluid (56) disposed in the housing (36) surrounds the cylinder (28) such that it coacts with the housing (36) and cylinder (28). In the presence of a magnetic field, the ERM fluid (56), cylinder (28) and housing (36) frictionally control the rotary movement of the first damping member (16) relative to the second damping member (20).

18 Claims, 4 Drawing Sheets

SPACECRAFT DEPLOYMENT MECHANISM DAMPER

BACKGROUND OF THE INVENTION

1. Technical Field

The present invention is generally related to damper mechanisms and, more particularly, to an electrorheological magnetic (ERM) fluid-based damper for controlling the deployment and operation of spacecraft appendages such as solar array panels, antennas, optical platforms, and other spacecraft structural elements.

2. Discussion

Deployment of spacecraft appendages such as antenna dishes, solar panel arrays, etc. are mission-critical operations that must be accomplished reliably and in a controlled fashion without causing damage or excessive disturbances and oscillations in the spacecraft. Conventional spacecraft typically use magnetic-type devices for deployment mechanisms. These devices include controllable electric motors and damper devices known as "eddy current" dampers.

In light of recent deployment problems, civilian and defense spacecraft customers are requiring torque margins for deployment mechanisms many times greater than earlier levels. This torque margin, as well as the revised requirements for damping rate, response time, and control, are beyond the capabilities of the typical presently used damper and control devices. Thus, the enhanced requirements have created a need for more powerful deployment mechanisms with much greater damper and control system performance.

It has now been found desirable to utilize electrorheological magnetic (ERM) fluid for enhanced damping control. ERM fluids undergo a change in apparent viscosity when subjected to a magnetic field. In the presence of a magnetic field, the particles become polarized and are thereby organized into chains and columns of particles within the fluid. The chains and columnar arrangement of particles act to increase the apparent viscosity or flow resistance of the overall material. In the absence of a magnetic field, the particles return to an unorganized or free state and the apparent viscosity or flow resistance of the overall material is correspondingly reduced.

Due to its variable resistance, ERM materials have been found useful in providing varying damping forces as well as in controlling torque and/or pressure levels. ERM fluids exhibit high yield strengths and are capable of generating great damping forces. Furthermore, ERM materials are activated by magnetic fields which are easily produced by simple, low-voltage electromagnetic coils.

Accordingly, it would be desirable to provide a deployment mechanism employing an ERM fluid based damper capable of meeting advanced spacecraft requirements. The ERM damper could be used to control the driving force or torque of a reliable spring or motor-driven actuator. Furthermore, it would be desirable to provide an ERM damper capable of fixed or variable damping control or a combination thereof.

SUMMARY OF THE INVENTION

The above and other objects are provided by an electrorheological magnetic (ERM) fluid-based rotary motion damper. The ERM fluid-based rotary motion damper generally includes an input shaft coupled to a first damping member and rotatably supporting a second damping member. A cylinder coupled about the first damping member rotatably engages a housing circumferentially coupled about the second damping member. As such, the cylinder is configured for rotary movement relative to the housing. ERM fluid disposed in the housing surrounds the cylinder such that it coacts with the housing and cylinder. In the presence of a magnetic field, the ERM fluid, cylinder and housing frictionally control the rotary movement of the first damping member relative to the second damping member.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

Figure 1:
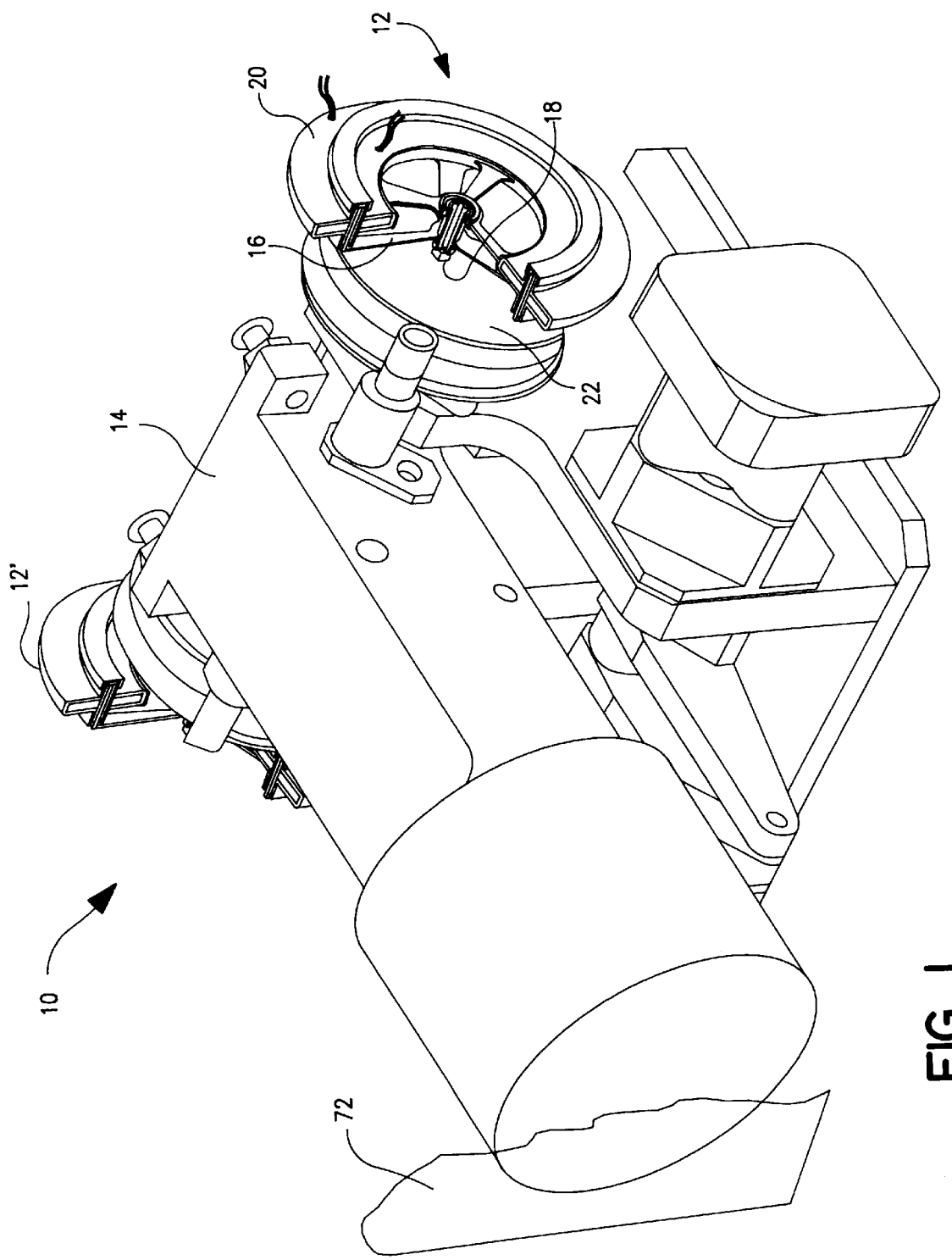
FIG. 1 is a perspective view of a spring-driven spacecraft appendage deployment mechanism with a partially cut away ERM fluid damper incorporated therein in accordance with the teachings of the present invention.

The present invention is directed toward a superior performance deployment mechanism capable of meeting advanced spacecraft requirements including an electrorheological magnetic (ERM) fluid based damper in combination with a reliable spring or motor-driven actuator. The ERM damper contains a fluid responsive to a magnetic field for controlling the driving force or torque of the actuator. Application of a magnetic field to the ERM fluid increases its shear stress which is used to resist the relative motion of two damping surfaces in contact with the fluid. In accordance with the teachings of the present invention, a fixed damping force for providing passively controlled damping or a variable damping force for providing actively-controlled damping are available.

Referring now to the figures, a deployment mechanism capable of meeting advanced spacecraft requirements is shown generally at 10. The deployment mechanism 10 includes an electrorheological magnetic fluid damper 12 in combination with a spring driven actuator 14. Although a spring driven actuator 14 is shown, it is to be understood that the ERM fluid damper 12 is also suitable for use in combination with other known actuators such as motor driven actuators.

Preferably, the ERM fluid damper 12 includes an inner rotatable member 16 coupled to an input shaft 18. Rotation of the input shaft 18 by the actuator 14 rotates the inner member 16. A stationary outer member 20 is rotatably supported about the input shaft 18 such that the input shaft 18 may rotate freely with respect to the outer member 20. The input shaft 18 is operably coupled to the actuator 14 after passing through a non-rotatable plate of the spring driven actuator 14. Thus, the driving force or torque generated from the spring driven actuator 14 is conveyed to the damper 12 via the input shaft 18.

The deployment mechanism 10 also includes a second damper 12' disposed opposite the damper 12. The damper 12' may be identical to the damper 12 or may be an alternate embodiment thereof. In either case, the dampers 12 and 12' combine to dampen the actuator 14. It should be noted, however, that in some applications it may be desirable to only include one of the dampers 12 or 12'.

Figure 2:
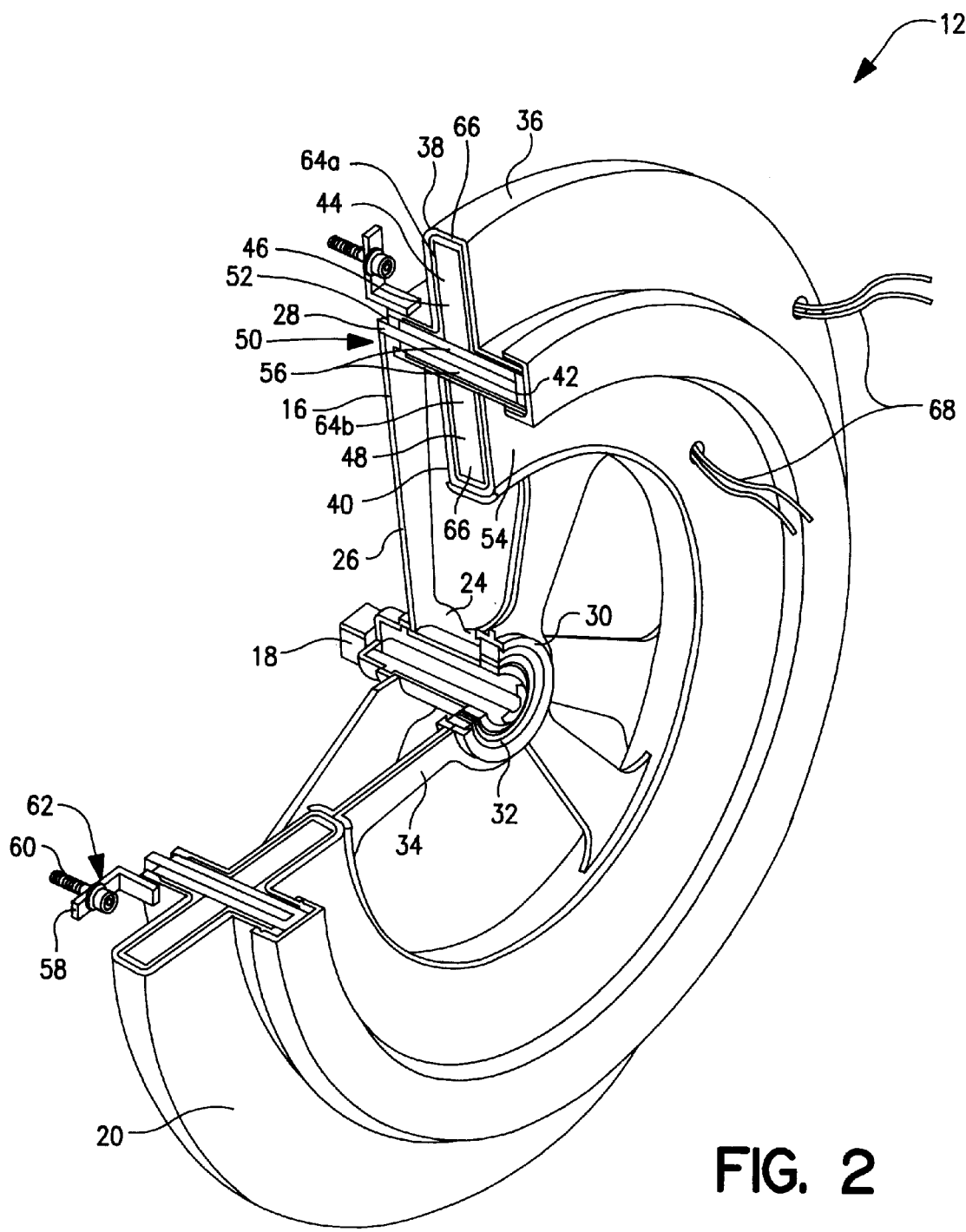
FIG. 2 is a side perspective view in partial cross-section of an electromagnetic ERM damper device for actively controlling damping.

Turning now to FIG. 2, a more detailed view of a first embodiment of the ERM fluid damper 12 is shown. The inner rotatable member 16 includes a mounting hub 24 secured to the input shaft 18. A plurality of ribs or arms 26 radially project from the mounting hub 24 to an axially extending annular flange or cylinder 28. The flange 28 is disposed in spaced-apart circumferential relation to the input shaft 18.

The outer member 20 includes a mounting hub 30 rotatably supported about the input shaft 18 such that the input shaft 18 may rotate freely therewithin. Preferably, this is accomplished by inserting a sleeve 32 between the input shaft 18 and the mounting hub 30. A plurality of ribs or arms 34 radially extend from the mounting hub 30 to support a hoop-shaped housing 36 circumferentially thereon. Preferably, the housing 36 has a generally cross-shaped cross-section including vertical chambers 38 and 40 and a horizontal chamber 42 therein.

As can be seen, the horizontal chamber 42 bisects the vertical chambers 38 and 40. The vertical chambers 38 and 40 are configured for supporting means 44 for generating a magnetic field across the horizontal chamber 42. For example, the vertical chamber 38 contains a first magnet 46 and the vertical chamber 40 contains a second magnet 48. The magnets 46, 48 are disposed in spaced relation across the horizontal chamber 42.

The horizontal chamber 42 includes an open end 50 adapted to receive the annular flange 28 of the inner member 16. In this way, the flange 28 may rotate within the housing 36 under the influence of the input shaft 18. Two O-rings 52 sealingly engage the flange 28 and the walls 54 of the horizontal chamber 42 to form a fluid tight compartment.

The horizontal chamber 42 is filled with ERM fluid 56 which substantially encompasses the cylinder 28. As such, a magnetic field may be generated across the horizontal chamber 42 from the magnets 46, 48 disposed in the vertical chambers 38 and 40. In the presence of the magnetic field, the shear stress of the ERM fluid 56 changes. In turn, the shear resistance of the ERM fluid 56 increases which serves to slow the rotation of the flange 28 relative to the housing 36. By changing this shear resistance, the rotation of the inner member 16 relative to the outer member 20 may be controlled. The controlled rotation of the inner member 16 is transferred to the input shaft 18 to dampen the actuator 14 (FIG. 1).

An example of an ERM fluid which may be used in the spacecraft deployment mechanism 10 is described in U.S. Pat. No. 5,354,488 to Shtarkman et al., which is assigned to the assignee of the present invention. Shtarkman discloses a fluid responsive to a magnetic field. The fluid comprises magnetizable particles, an oil vehicle, and a dispersant comprising small non-magnetizable dispersant particles which are insoluble in the vehicle. The magnetizable particles may be any suitable magnetizable materials such as iron, cobalt, nickel, their alloys, magnetic ferrites, and compounds of iron, nickel or cobalt with rare earth elements, chromium, silicon, boron, mixtures of the above, and certain magnetizable stainless steels. It should be noted that oil vehicles suitable for space applications generally have a low vapor pressure (e.g., less than $10^{-3}$ mm Hg (0.13 Pa) and remain liquidic over a wide temperature range (preferably between $-60°$ to $200°$ C.).

A plurality of mounting brackets 58 may be spot-welded or otherwise fixedly secured to the exterior of the housing 36 for mounting the housing 36 to the plate 22 (FIG. 1). A plurality of bolts 60 passing through apertures 62 in the mounting brackets 58 can be used effectively for this purpose. After mounting, the outer member 20 is held stationary about the rotating input shaft 18 with respect to the inner member 16.

In the embodiment shown in FIG. 2, the magnet 46 disposed within the vertical chamber 38 is an electromagnet. Likewise, the magnet 48 disposed within the vertical chamber 40 is an electromagnet. A low power excitation coil 66 is provided proximate each electromagnet 46 and 48 for selectively generating the magnetic field. A pair of low voltage power/connector leads 68 extend through the housing 36 and electrically communicate with each coil 66 therein. Accordingly, electrically variable shear stress and actively controlled damping is provided. In some applications, it may also be desirable to integrate a sensor/controller system with feedback to coordinate the changes in the damping characteristics of the damper 12. It should be noted that the damper 12 can also be successfully operated with only one of the electromagnets 46 and 48. Also, if both electromagnets 46 and 48 are employed for energizing the ERM fluid 56, each of the coils 66 should be arranged in such a way that opposite magnetic polarities are generated at the electromagnet poles.

Figure 3:
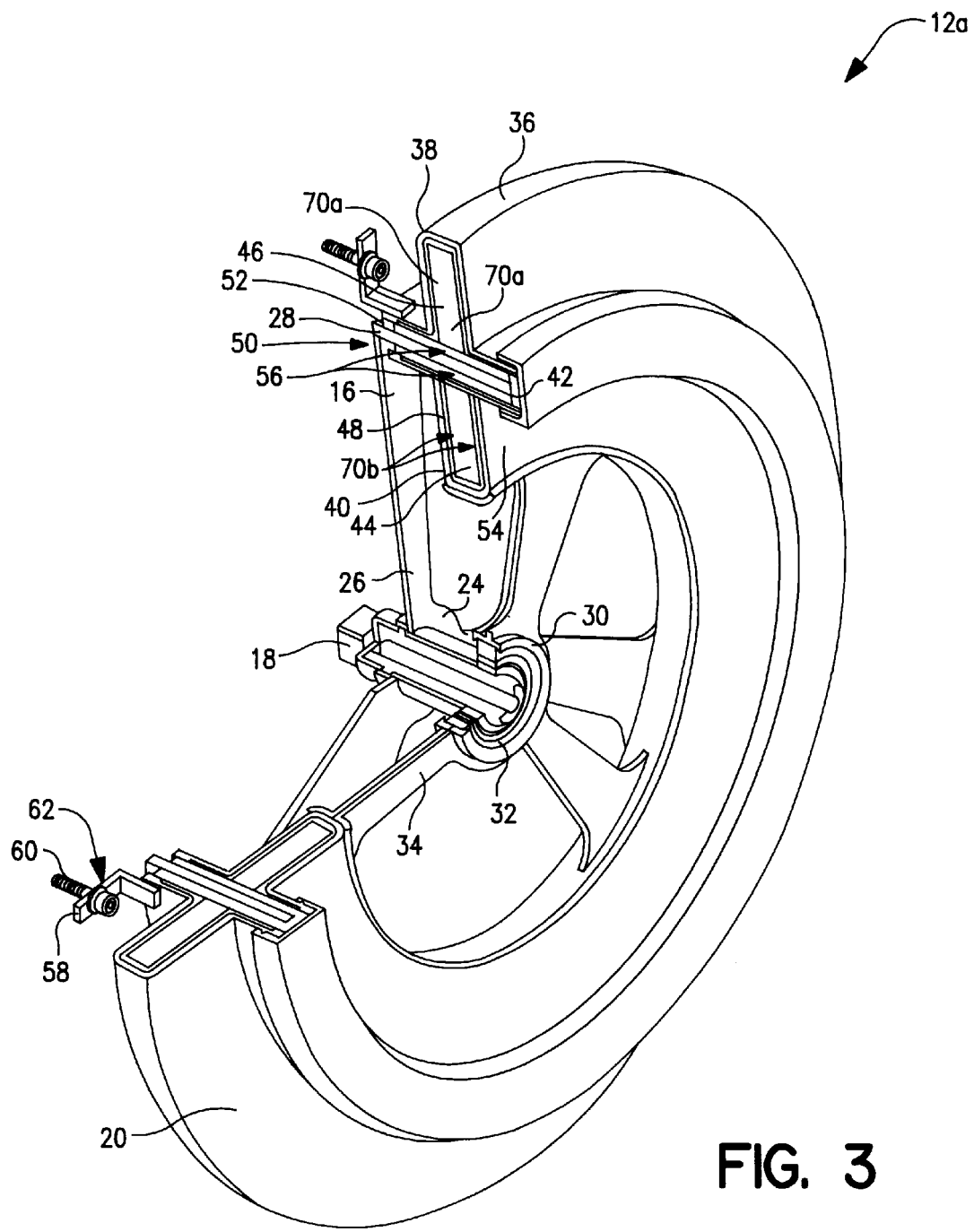
FIG. 3 is a side perspective view in partial cross-section of a permanent magnetic ERM damper device for providing passive damping.

Turning now to FIG. 3, a second embodiment ERM damper 12a is illustrated. This embodiment is essentially identical to the first embodiment except that the electromagnets 46 and 48 have been replaced by permanent magnets 70a and 70b within the vertical chambers 38 and 40. Additionally, the electronic hardware, i.e., excitation coils 66 and power/connector leads 68 associated with the electromagnets 46 and 48, are omitted. The permanent magnets 70a and 70b generate a fixed magnetic field over the ERM fluid 56 in the horizontal chamber 42. As such, a pre-selected permanent flow resistance is provided within the damper 12a. Thus, passive control of the damping characteristics of the damper 12a is provided.

Figure 4:
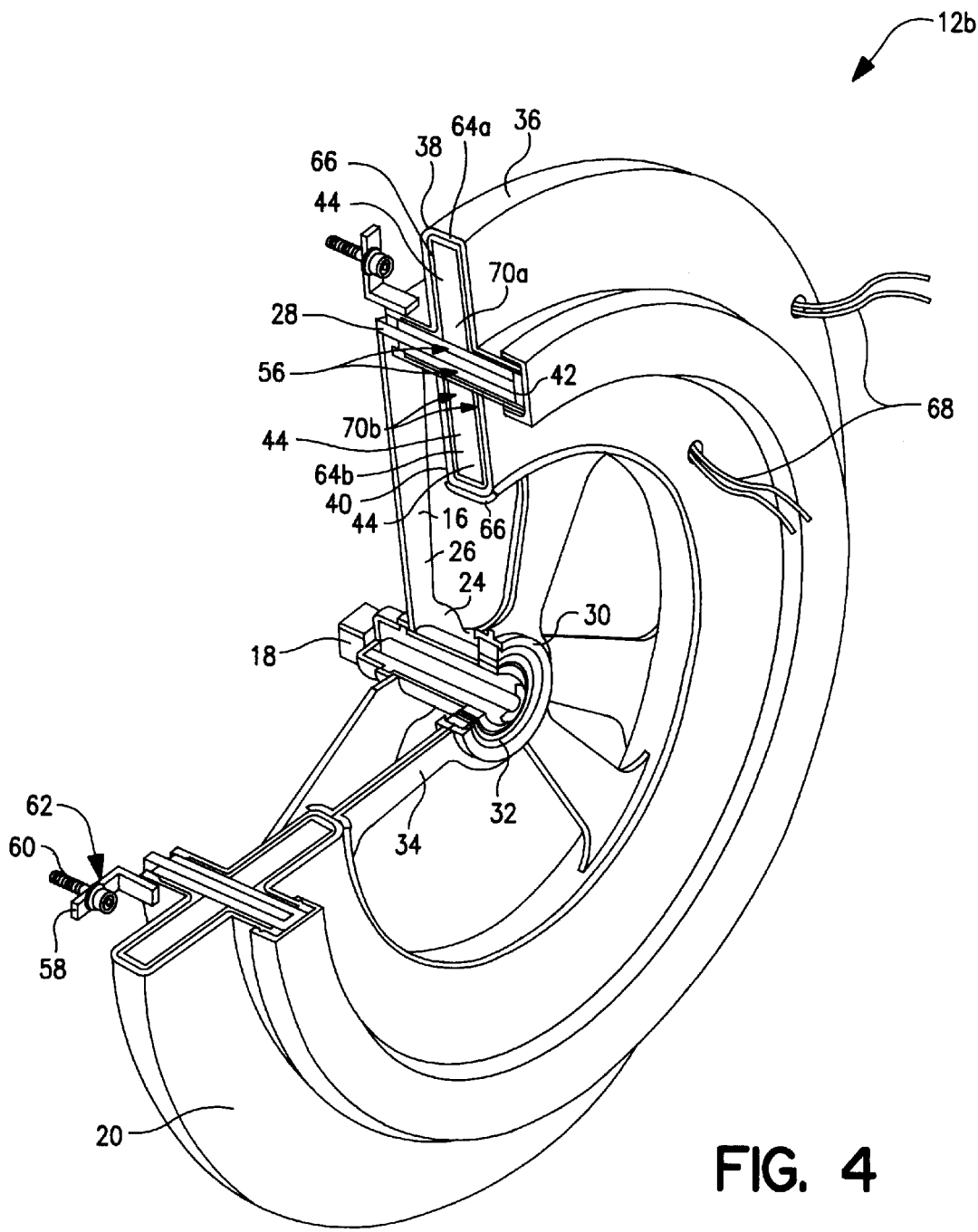
FIG. 4 is a side perspective view in partial cross-section of an integrated electro/permanent magnet ERM damper device.

A third embodiment ERM damper 12b is illustrated in FIG. 4. In this embodiment, a combination of permanent magnets 70a and 70b and electromagnets 46 and 48 are disposed within the vertical chambers 38 and 40. As with the first embodiment, low power excitation coils 66 and low voltage power/connector leads 68 are provided for inducing a magnetic field from the electromagnets 46 and 48. According to this configuration, a given flow resistance is provided within the damper 12b which may be ramped up by excitation of the electromagnets 46 and 48. Thus, a combination passive damping control and active damping control device is provided. Preferably, light weight electromagnets 46 and 48 are utilized in both the first and third embodiments.

In operation, the spring driven actuator 14 is operated such that it deploys or asserts control over a given spacecraft appendage (generally indicated by the numeral 72 in FIG. 1). The input shaft 18 is rotationally driven by the actuator 14. In turn, the input shaft 18 rotates the inner member 16. The outer member 20, which is rotatably supported about the input shaft 18, remains stationary with respect to the input shaft 18 and inner member 16.

The annular flange 28, which is a part of the inner member 16 rotates within the horizontal chamber 42 of the housing 36. The ERM fluid 56 within the horizontal chamber 42 interacts with the cylinder 28 and chamber walls 54 according to its flow resistance characteristics to frictionally effect the movement therebetween. This flow resistance is varied according to the magnetic field to which the ERM fluid 56 is subjected.

In the case of permanent magnets 70a and 70b, a fixed shear stress associated with the ERM fluid 56 dampens the rotation of the inner member 16 by a preselected amount. In the case of electromagnets 46 and 48, either alone or in combination with the permanent magnets 70a and 70b, a variable damping of the inner member 16 occurs corresponding to the activation of the electromagnets 46 and 48. As such, the rotary movement of the inner member 16 can be controlled by utilizing the variable shear stress characteristic of the ERM fluid 56.

From the foregoing it can be appreciated that the ERM damper directly transforms magnetic energy into mechanical energy without multiple mechanical stages. The dampers have a high output power-to-weight ratio and a fast (a few milliseconds) response time. Also, the dampers have a controllable and velocity-independent damping rate that permits near instantaneous application of high torque without the need for generating high rotational speeds. Additionally, the damper has the capability for both passive and active control with a high mechanical work output-to-electrical power ratio. The dampers are suitable for reliably and smoothly handling both slow and rapid deployment situations without causing disturbances or oscillations to the spacecraft. The dampers are low-cost and simple to manufacture since they do not require precision machining or high-tolerance parts. The dampers are sealed devices which require only a very small quantity of space qualified fluid for reliable and low contamination risk operation.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A rotary damper for use in spacecraft appendage deployment mechanisms comprising:

an input shaft;

a first member coupled to said input shaft;

a second member disposed proximate said first member, said first member being rotatable relative to said second member;

said second member including a circumferential housing having at least a pair of chambers formed therein, one of said chambers accommodating a portion of said first member therein such that said portion is rotatable relative to said housing;

an electrorheological magnetic fluid disposed in said one of said chambers and coacting with said portion of said first member and said housing of said second member; and means disposed in another of said chambers of said housing for generating a magnetic field across said electrorheological magnetic fluid such that a shear resistance characteristic of said electrorheological magnetic fluid is changed to thereby control relative rotational movement between said first and second members.

2. The damper of claim 1 wherein said portion of said first member further comprises an annular flange which is rotatable relative to said second member.

3. The damper of claim 1 wherein said means for generating a magnetic field comprises permanent magnets.

4. The damper of claim 1 wherein said means for generating a magnetic field comprises electromagnets.

5. The damper of claim 1 wherein said means for generating a magnetic field comprises a combination of electromagnets and permanent magnets.

6. An electrorheological magnetic fluid-based rotary motion damper comprising:

an input shaft;

a first member coupled to said input shaft;

a cylinder coupled about said first member including an annular flange extending therefrom;

a second member supported along said input shaft such that said input shaft may rotate relative to said second member;

said second member including a circumferential housing, said housing including a vertical chamber and a horizontal chamber, said horizontal chamber bisecting said vertical chamber into an upper chamber and a lower chamber;

said annular flange projecting into said horizontal chamber and being rotatable relative thereto, an electrorheological magnetic fluid disposed in said horizontal chamber of said housing and coacting with said housing and said annular-flange; and means disposed in said upper chamber and said lower chamber in spaced relation across said horizontal chamber so as to be for generating a magnetic field over said electrorheological magnetic fluid such that a shear resistance characteristic of said electrorheological magnetic fluid is changed to frictionally control said relative rotational movement between said annular flange and said housing.

7. The damper of claim 6 wherein said first member further comprises:

an inner hub coupled to said input shaft; and a plurality of arms radially projecting from said inner hub for supporting said annular flange.

8. The damper of claim 6 wherein said means for generating a magnetic field comprises one of the group consisting of permanent magnets and electromagnets.

9. The damper of claim 6 wherein said means for generating a magnetic field comprises a combination of electromagnets and permanent magnets.

10. The damper of claim 6 wherein said second member further comprises:

an inner hub rotatably supported about said input shaft; and a plurality of arms radially projecting from said inner hub for circumferentially supporting said housing.

11. An electrorheological magnetic fluid-based rotary-motion damper for controlling deployment of spacecraft appendages comprising:

an input shaft;

a first mounting hub coupled to said input shaft;

a first plurality of ribs radially projecting from said hub;

a cylinder axially extending from said plurality of ribs;

a second hub rotatably supported about said input shaft;

a second plurality of ribs radially projecting from said second hub;

an annular housing circumferentially supported on said second plurality of ribs;

said annular housing having a generally cross-shaped cross-section including a vertical chamber and a horizontal chamber;

said cylinder being disposed within said horizontal chamber and being rotatable relative to said annular housing;

electrorheological magnetic fluid disposed in said horizontal chamber coacting with said housing and said cylinder; and means for generating a magnetic field disposed in said vertical chamber for causing said electrorheological magnetic fluid to exhibit a given shear stress characteristic to control relative rotational movement between said cylinder and said housing and dampen said deployment through said input shaft.

12. The damper of claim 11 wherein said electrorheological magnetic fluid comprises an oil vehicle, magnetizable particles, and a dispersant.

13. The damper of claim 12 wherein said oil vehicle has a vapor pressure characteristic less than $10^{-3}$ mm Hg (0.13 Pa) over a temperature range of −60° to 200° C.

14. The damper of claim 12 wherein said oil vehicle is liquidic over a temperature range extending from −60° to 200° C.

15. The damper of claim 12 wherein said magnetizable particles comprise at least one of the group consisting of iron, cobalt, nickel, and magnetizable rare earth elements.

16. The damper of claim 11 wherein said means for generating a magnetic field comprises permanent magnets.

17. The damper of claim 11 wherein said means for generating a magnetic field comprises electromagnets.

18. The damper of claim 11 wherein said means for generating a magnetic field comprises a combination of electromagnets and permanent magnets.

* * * * *